US010247559B2

(12) United States Patent
Dorum

(10) Patent No.: US 10,247,559 B2
(45) Date of Patent: Apr. 2, 2019

(54) METHOD AND APPARATUS FOR DISAMBIGUATING PROBE POINTS WITHIN AN AMBIGUOUS PROBE REGION

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/144,130

(22) Filed: May 2, 2016

(65) Prior Publication Data

US 2017/0314936 A1    Nov. 2, 2017

(51) Int. Cl.
*G01C 21/32* (2006.01)
*G09B 29/00* (2006.01)
(Continued)

(52) U.S. Cl.
CPC .......... *G01C 21/32* (2013.01); *B60W 50/14* (2013.01); *G06F 17/30* (2013.01); *G08G 1/0112* (2013.01);
(Continued)

(58) Field of Classification Search
CPC ...... G01C 21/30; G01C 21/32; G08G 1/0112; G09B 29/003; G09B 29/004;
(Continued)

(56) References Cited

U.S. PATENT DOCUMENTS 7,516,041 B2 * 4/2009 Smartt ................ G01C 21/32
702/167
7,660,441 B2   2/2010 Chen et al.
(Continued)

FOREIGN PATENT DOCUMENTS

JP    2008233015 A  * 10/2008
JP    2008241406 A  * 10/2008
(Continued)

OTHER PUBLICATIONS

JPO machine translation of JP 2009-064205 (original JP document published Mar. 26, 2009).*
(Continued)

*Primary Examiner* — Behrang Badii
*Assistant Examiner* — David A Testardi
(74) *Attorney, Agent, or Firm* — Alston & Bird LLP

(57) ABSTRACT

A method, apparatus and computer program product are provided to disambiguate probe points within an ambiguous probe regions to permit more reliable association with a road segment. In regards to a method, probe trajectory identifiers (IDs) of probe points along at least a portion of the first and second branches that lead away from an ambiguous probe region are separately identified and form first and second sets of probe trajectory IDs, respectively. For the ambiguous probe region, the probe trajectory IDs of probe points along a third branch that leads toward the ambiguous probe region are identified and form a third set of probe trajectory IDs. The method also includes classifying probe trajectory IDs from the third set as being associated with the first branch or the second branch in an instance in which the probe trajectory IDs are additionally included in the first set or the second set, respectively.

17 Claims, 7 Drawing Sheets

(51) Int. Cl.
*B60W 50/14* (2012.01)
*G08G 1/01* (2006.01)
*G09B 29/10* (2006.01)
*G06F 17/30* (2006.01)
*B60W 30/08* (2012.01)

(52) U.S. Cl.
CPC ......... *G08G 1/0129* (2013.01); *G09B 29/007* (2013.01); *G09B 29/106* (2013.01); *B60W 30/08* (2013.01)

(58) Field of Classification Search
CPC ... G09B 29/007; G09B 29/106; B60W 30/08; B60W 50/0098; B60W 50/14
See application file for complete search history.

(56) References Cited

U.S. PATENT DOCUMENTS

| | | | | |
|---|---|---|---|---|
| 8,620,532 | B2* | 12/2013 | Curtis | G06Q 30/0282 370/401 |
| 9,026,300 | B2 | 5/2015 | Ferguson | |
| 2005/0004753 | A1 | 1/2005 | Weiland et al. | |
| 2007/0150185 | A1* | 6/2007 | Nagase | G01C 21/30 701/422 |
| 2009/0138188 | A1 | 5/2009 | Kores et al. | |
| 2010/0305850 | A1* | 12/2010 | Krumm | G01C 21/32 701/532 |
| 2011/0196611 | A1 | 8/2011 | Smartt et al. | |
| 2013/0158794 | A1 | 6/2013 | Wilson | |
| 2013/0328924 | A1 | 12/2013 | Arikan et al. | |
| 2015/0285656 | A1* | 10/2015 | Verheyen | G01C 21/32 701/428 |
| 2016/0102984 | A1* | 4/2016 | Dorum | G01C 21/26 701/409 |
| 2016/0102986 | A1* | 4/2016 | Ma | G08G 1/0112 702/5 |
| 2016/0223344 | A1* | 8/2016 | Sanami | G01C 21/30 |
| 2017/0322035 | A1* | 11/2017 | Dorum | G01C 21/30 |

FOREIGN PATENT DOCUMENTS

| | | | |
|---|---|---|---|
| JP | 2009064205 A | * | 3/2009 |
| JP | 4825758 B2 | * | 11/2011 |
| JP | 2015011379 A | * | 1/2015 |
| WO | WO 2014/080023 A1 | | 5/2014 |

OTHER PUBLICATIONS

EPO machine translation of JP 4825758 B2 (original JP document published Nov. 30, 2011).*
Schroedl, Stefan, et al., " Mining GPS traces for map refinement", Data Mining and Knowledge Discovery, 9, 2004, pp. 59-87.*
Edelkamp, Stefan et al., "Route Planning and Map Inference with Global Positioning Traces", Lecture Notes in Computer Science, LNCS 2598, Springer-Verlag, pp. 128-151, 2003 (Year: 2003).*
JPO machine translation of JP 2008-233015 (original JP document published Oct. 2, 2008) (Year: 2008).*
Biagioni et al., *Inferring Road Maps From GPS Traces: Survey and Comparative Evaluation*, 91st Annual Meeting of the Transportation Research Board (Nov. 15, 2011) 1-21.
Tong, D. et al., *Traffic Information Deriving Using GPS Probe Vehicle Data Integrated with GIS*, Retrieved from the Internet: <URL: http://www.gis-t.org/files/13auY.pdf>. (Nov. 17, 2005) 1-23.
U.S. Appl. No. 14/622,026, filed Feb. 13, 2015, in re: Dorum et al. entitled *Method and Apparatus for Generating Map Geometry Based on a Received Image and Probe Data*.
U.S. Appl. No. 14/729,733, filed Jun. 3, 2015, in re: Dorum entitled *Method and Apparatus for Defining Bi-Directional Road Geometry From Probe Data*.
International Search Report and Written Opinion from International Patent Application No. PCT/EP2017/060288, dated Aug. 4, 2017, 16 pages.

* cited by examiner

METHOD AND APPARATUS FOR DISAMBIGUATING PROBE POINTS WITHIN AN AMBIGUOUS PROBE REGION

TECHNOLOGICAL FIELD

An example embodiment is directed generally to the creation of road geometry from probe points and, more particularly, to the creation of more reliable road geometry by disambiguating the probe points within an ambiguous probe region.

BACKGROUND

In order to define road geometry that may be utilized for mapping and navigational purposes, probe data may be collected from a variety of probe sources. For example, probe data that identifies the location and heading of a probe source at a particular moment in time may be provided by mobile telephones, such as smart phones, global positioning systems (GPS) that are carried by vehicles and other types of navigation systems. Several different techniques may be employed in order to create road geometry from probe data in instances in which the probe data has a relatively high density and includes relatively high frequency trajectory information.

For example, K-means trajectory clustering associates the trajectories of a cluster of seed points that are spatially close to one another and that have similar headings. However, K-means trajectory clustering generally requires probe data that has low noise and a high probe frequency which results in relatively short distances between probe points in order for the trajectory shape to approximate the road geometry. Another technique is trajectory merging in which probe trajectories are traversed and matching graph edges are merged. Trajectories that do not match existing edges create new edges in the graph. Trajectory merging also requires probe data having relatively low noise and high probe frequency such that there are relatively short distances between probe points in order for the trajectory shape to approximate the road geometry.

A kernel density estimation technique may also be utilized to create road geometry by computing an approximate kernel density estimate of trajectories of probe points or edges over an area of interest. The kernel density estimation technique applies a threshold to produce a binary image of the roads followed by the use of various methods, such as thinning, to produce road centerlines from the binary image. The kernel density estimation technique also requires high density probe data.

Another technique utilizes principal curves. Principal curves describe self-consistent curves that pass through the middle of point data. The principal curves technique may detect individual road segments that require additional logic to address intersections and to create a road network graph. The principal curves technique also requires high probe point density and uniform probe point density to produce the desired results.

As the foregoing techniques illustrate, current techniques for creating road geometry from probe data generally rely on high frequency trajectory information and high density probe data. In instances in which the probe data is sparse and/or noisy, the foregoing techniques may be less successful in accurately generating the road geometry. In this regard, probe data that is noisy may exhibit positional errors, heading errors, sparseness, gaps and uneven probe density and other anomalies including overlapping global positioning system (GPS) data from adjacent roads. As a result of the noisy nature of probe data, ambiguous probe regions may exist in which overlapping probe points cannot be reliably classified as belonging to a specific road segment using probe properties such as speed, heading, height or density. For example, during the creation of the road geometry from relatively low frequency probe data, ambiguous probe regions may exist in instances in which multiple roads with similar headings overlap, such as ramps, bifurcations, frontage roads, highway exchange crossovers and adjacent roads. In these situations, the probe distributions for vehicles traveling along each of the multiple roads have similar headings and positionally overlap, thereby creating an ambiguous probe region in which it is difficult to reliably identify the road segment with which each probe is associated.

With reference to FIG. 1 and by way of example, at a point in which a ramp 10 exits from a highway 12, the road segments representative of the highway and the ramp are joined and the width of the road increases. Similarly, the width of the probe distribution for the probes having similar headings, such as the probes collected by vehicles traveling along the ramp or along the highway at the point at which the road segments are joined, increases. The change in the width of the probe distribution may be an indication that two or more road segments have merged or split, two or more road segments pass close to one another with the vehicles traveling along the road segments having similar probe headings, or two or more roads pass over or under one another with the vehicles traveling along the road segments having similar probe headings. With respect to FIG. 1, the grayscale of the probe points is representative of the heading of the probe point, such that probe points of the same grayscale have the same or similar headings while probe points having different grayscales have different headings.

At such locations, the failure to disambiguate the probe data so as to classify the probe points within the ambiguous probe region as belonging to a respective road segment or branch may cause the resulting road geometry to be inaccurate or imprecise. For example, the failure to disambiguate the probe points in an ambiguous probe region designated 14 in FIG. 1 brought about by the splitting of a ramp 10 from a highway 12 may create a road geometry in which the ramp merges with the highway too soon. Additionally, the failure to disambiguate the probe points in an ambiguous probe region in which two or more road segments pass close to one another with the probe points collected by the vehicles traveling along the road segments having similar probe headings, may cause the two or more road segments to be improperly merged. See, for example, the ambiguous probe region designated 16 in FIG. 1 created by the close positional relationship of a portion of the ramp and a nearby road 18. Further, in an instance in which two or more road segments cross over or under one another with the probe points in the ambiguous probe region being collected by vehicles traveling along the road segments with similar probe headings, the two or more crossing road segments may be improperly merged so as to create a false ramp geometry.

The probe distributions from multiple road segments within an ambiguous probe region may sometimes be disambiguated in instances in which the probe points include very high frequency trajectory information, such as probe points collected every ten seconds or less. However, the probe distributions in such ambiguous probe regions cannot generally be reliably disambiguated in instances in which the probe points provide relatively low frequency trajectory information, thereby potentially leading to the above-described problems in conjunction with the construction of road geometry.

BRIEF SUMMARY

A method, apparatus and computer program product are provided in accordance with an example embodiment in order to disambiguate probe points within an ambiguous probe region such that the probe points can be reliably associated with a respective road segment. In this regard, the method, apparatus and computer program product of an example embodiment are configured to disambiguate the probe points within an ambiguous probe region in an instance in which the probe points were collected at a low frequency, such as probe points collected every 30 seconds or more. Thus, the method, apparatus and computer program product of an example embodiment permit the road geometry to be more reliably constructed in a region in which two or more road segments merge or pass near one another with vehicles traveling therealong having similar trajectories, even in instances in which the probe data is collected at a relatively low frequency.

In an example embodiment, a method is provided that includes, for an ambiguous probe region, separately identifying probe trajectory identifiers (IDs) of probe points along at least a portion of each of the first and second branches that lead away from the ambiguous probe region. The probe trajectory IDs identified along at least a portion of the first and second branches include first and second sets of probe trajectory IDs, respectively. For the ambiguous probe region, the method also include identifying probe trajectory IDs of the probe points along a third branch that leads toward the ambiguous probe region. The probe trajectory IDs along the third branch include a third set of probe trajectory IDs. The method also includes classifying probe trajectory IDs from the third set as being associated with the first branch in an instance in which the probe trajectory IDs are included in both the first and third sets. Similarly, the method classifies probe trajectory IDs from the third set as being associated with the second branch in an instance in which the probe trajectory IDs are included in both the second and third sets.

The method of an example embodiment also includes associating one or more probe points in the ambiguous probe region with the first branch in an instance in which the one or more probe points have probe trajectory IDs that match the probe trajectory IDs from the third set that are classified as being associated with the first branch. Similarly, the method of this example embodiment includes associating one or more probe points in the ambiguous probe region with the second branch in an instance in which the one or more probe points have probe trajectory IDs that match the probe trajectory IDs from the third set that are classified as being associated with the second branch.

The method of an example embodiment also includes identifying the ambiguous probe region by identifying a shift of a road center by at least a predetermined amount. In an example embodiment, the method classifies the probe trajectory IDs from the third set as being associated with the first branch by excluding probe trajectory IDs from the third set from being associated with the first branch in an instance in which the probe trajectory IDs are also included in the second set. Similarly, the method of an example embodiment classifies the probe trajectory IDs from the third set as being associated with the second branch by excluding probe trajectory IDs from the third set from being associated with the second branch in an instance in which the probe trajectory IDs are also included in the first set.

In an example embodiment, the probe trajectory IDs are associated with the probe points collected at a sampling frequency of one sample per at least thirty seconds. The method of an example embodiment separately identifies probe trajectory IDs of the probe points along at least a portion of the first and second branches by separately identifying probe trajectory IDs of the probe points along the same predefined length of the first and second branches downstream of the ambiguous probe region. In an instance in which the first branch splits into at least two sub-branches, the method may separately identify probe trajectory IDs of the probe points along at least a portion of the first and second branches by identifying probe trajectory IDs of the probe points along at least a portion of the at least two sub-branches of the first branch and including the probe trajectory IDs of the probe points along at least a portion of the at least two sub-branches in the first set of probe trajectory IDs.

In another example embodiment, an apparatus is provided that includes at least one processor and at least one memory storing computer program code with the at least one memory in the stored computer probe being configured, with the at least one processor, to cause the apparatus to at least separately identify, for an ambiguous probe region, probe trajectory identifiers (IDs) of probe points along at least a portion of each of first and second branches that lead away from the ambiguous probe region. The probe trajectory IDs identified along at least a portion of the first and second branches include first and second sets of probe trajectory IDs, respectively. For the ambiguous probe region, the at least one memory and the stored computer program code are also configured, with the at least one processor to cause the apparatus to identify probe trajectory IDs of the probe points along a third branch that leads towards the ambiguous probe region. The probe trajectory IDs along the third branch include a third set of probe trajectory IDs. The at least one memory and the stored computer program code are also configured, with the at least one processor, to cause the apparatus of an example embodiment to classify probe trajectory IDs from the third set as being associated with the first branch in an instance in which the probe trajectory IDs are included in both the first and third sets. Similarly, the at least one memory and the stored computer program code are configured, with the at least one processor, to cause the apparatus of this example embodiment to classify probe trajectory IDs from the third set as being associated with the second branch in an instance in which the probe trajectory IDs are included in both the second and third sets.

The at least one memory and the stored computer program code are further configured, with the at least one processor, to cause the apparatus of an example embodiment to associate one or more probe points in the ambiguous probe region with the first branch in an instance in which the one or more probe points have probe trajectory IDs that match the probe trajectory IDs from the third set that are classified as being associated with the first branch. Similarly, the at least one memory and the stored computer program code are further configured, with the at least one processor, to cause the apparatus of this example embodiment to associate one or more probe points in the ambiguous probe region with the second branch in an instance in which the one or more probe points have probe trajectory IDs that match the probe trajectory IDs from the third set that are classified as being associated with the second branch.

The at least one memory and the stored computer program code are further configured, with the at least one processor, to cause the apparatus of an example embodiment to identify the ambiguous probe region by identifying a shift of the road center by at least a predetermined amount. The at least one memory and the stored computer program code are configured, with the at least one processor, to cause the apparatus of an example embodiment to classify the probe trajectory IDs from the third set as being associated with the first branch by excluding probe trajectory IDs from the third set from being associated with the first branch in an instance in which the probe trajectory IDs are also included in the second set. Similarly, the at least one memory and the stored computer program code are configured, with the at least one processor, to cause the apparatus to classify the probe trajectory IDs from the third set as being associated with the second branch by excluding probe trajectory IDs from the third set from being associated with second branch in an instance in which the probe trajectory IDs are also included in the first set.

In an example embodiment, the probe trajectory IDs are associated with probe points collected at a sampling frequency of no more than one sample per thirty seconds. The at least one memory and the stored computer program code are configured, with the at least one processor, to cause the apparatus of an example embodiment to separately identify probe trajectory IDs of the probe points along at least a portion of the first and second branches by separating identifying probe trajectory IDs of the probe points along the same predefined length of the first and second branches downstream of the ambiguous probe region. In an instance in which the first branch splits into at least two sub-branches, the at least one memory and the stored computer program code are configured, with the at least one processor, to cause the apparatus to separately identify probe trajectory IDs of the probe points along at least a portion of the first and second branches by identifying probe trajectory IDs of the probe points along at least a portion of the at least two sub-branches of the first branch and including the probe trajectory IDs along at least a portion of the at least two sub-branches in the first set of probe trajectory IDs.

In a further example embodiment, a computer program product is provided that includes at least one non-transitory computer-readable storage medium having computer-readable program instructions stored therein. The computer-readable program instructions include, for an ambiguous probe region, program instructions configured to separately identify probe trajectory identifiers (IDs) of probe points along at least a portion of each of first and second branches that lead away from the ambiguous probe region. Probe trajectory IDs identified along at least a portion of the first and second branches include first and second sets of probe trajectory IDs, respectively. For the ambiguous probe region, the computer-readable program instructions further include program instructions configured to identify probe trajectory IDs of the probe points along a third branch that leads toward the ambiguous probe region. The probe trajectory IDs along the third branch include a third set of probe trajectory IDs. The computer-readable program instructions also include program instructions configured to classify probe trajectory IDs from the third set as being associated with the first branch in an instance in which the probe trajectory IDs are included in both the first and third sets. Similarly, the computer-readable program instructions of this example embodiment include program instructions configured to classify probe trajectory IDs from the third set as being associated with the second branch in an instance in which the probe trajectory IDs are included in both the second and third sets.

The computer-readable program instructions of an example embodiment further include program instructions configured to associate one or more probe points in the ambiguous probe region with the first branch in an instance in which the one or more probe points have probe trajectory IDs that match the probe trajectory IDs from the third set that are classified as being associated with the first branch. Similarly, the computer-readable program instructions of this example embodiment further include program instructions configured to associate one or more probe points in the ambiguous probe region with the second branch in an instance in which the one or more probe points have probe trajectory IDs that match the probe trajectory IDs from the third set that are classified as being associated with the second branch.

The computer-readable program instructions of an example embodiment further include program instructions configured to identify the ambiguous probe region by identifying a shift of the road center by at least a predetermined amount. In an example embodiment, the program instructions configured to classify the probe trajectory IDs from the third set as being associated with the first branch include program instructions configured to exclude probe trajectory IDs from the third set from being associated with the first branch in an instance in which the probe trajectory IDs are also included in the second set. Similarly, the program instructions configured to classify the probe trajectory IDs from the third set as being associated with the second branch may include program instructions configured to exclude probe trajectory IDs from the third set from being associated with the second branch in an instance in which the probe trajectory IDs are also included in the first set. In an example embodiment, the program instructions configured to separately identify probe trajectory IDs of the probe points along at least a portion of the first and second branches include program instructions configured to separately identify probe trajectory IDs of the probe points along the same predefined length of the first and second branches downstream of the ambiguous probe region.

In yet another example embodiment, an apparatus is provided that includes, for an ambiguous probe region, means for separately identifying probe trajectory identifiers (IDs) of probe points along at least a portion of the first and second branches that lead away from the ambiguous probe region. The probe trajectory IDs identified along at least a portion of the first and second branches include first and second sets of probe trajectory IDs, respectively. For the ambiguous probe region, the apparatus of this example embodiment also includes means for identifying probe trajectory IDs of the probe points along a third branch that leads toward the ambiguous probe region. The probe trajectory IDs along the third branch include a third set of probe trajectory IDs. The apparatus of this example embodiment also includes means for classifying probe trajectory IDs from the third set as being associated with the first branch in an instance in which the probe trajectory IDs are included in both the first and third sets. Similarly, the apparatus of this example embodiment includes means for classifying probe trajectory IDs from the third set as being associated with the second branch in an instance in which the probe trajectory IDs are included in both the second and third sets.

BRIEF DESCRIPTION OF THE DRAWINGS

Figure 1:
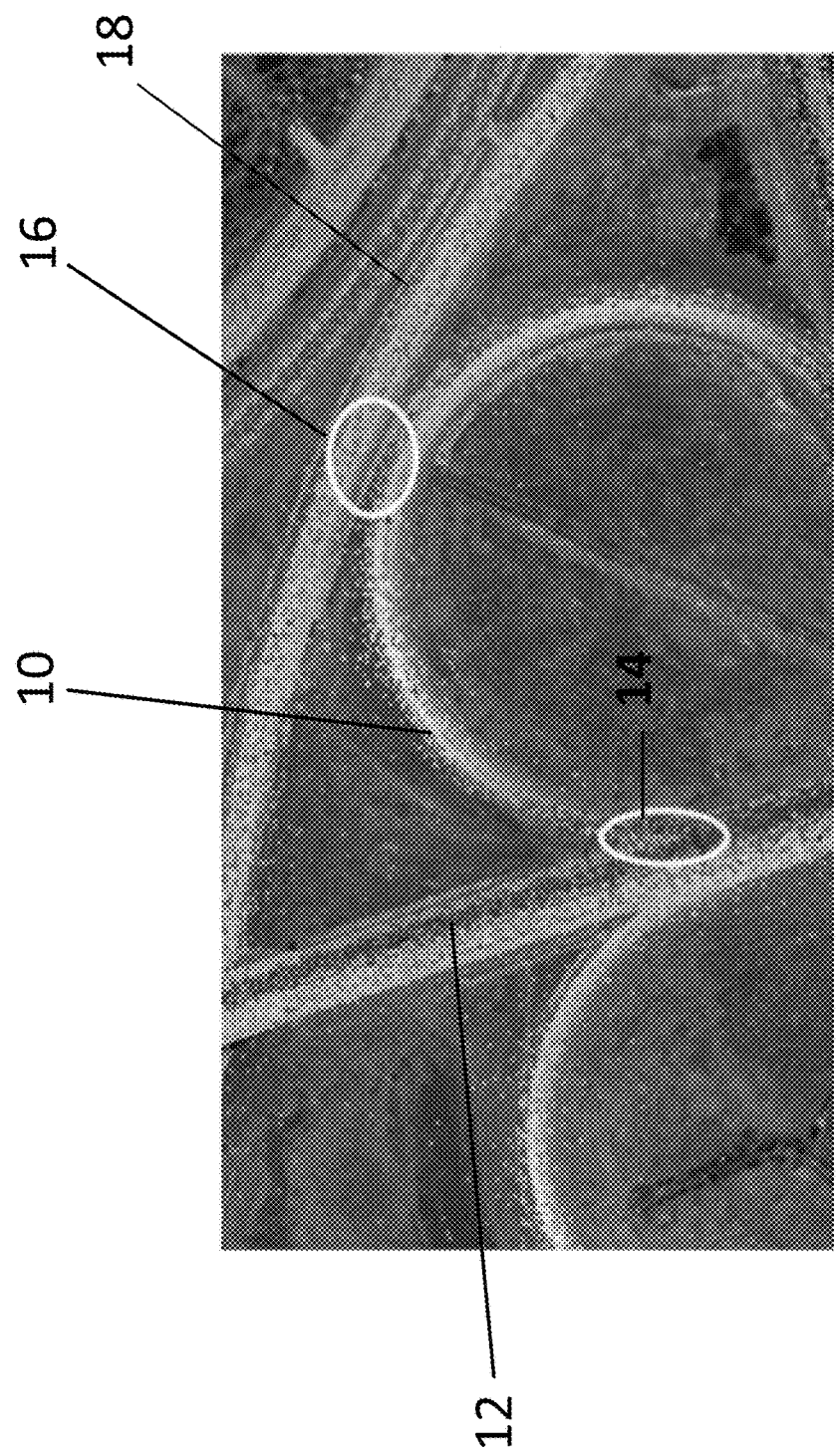
Figure 2:
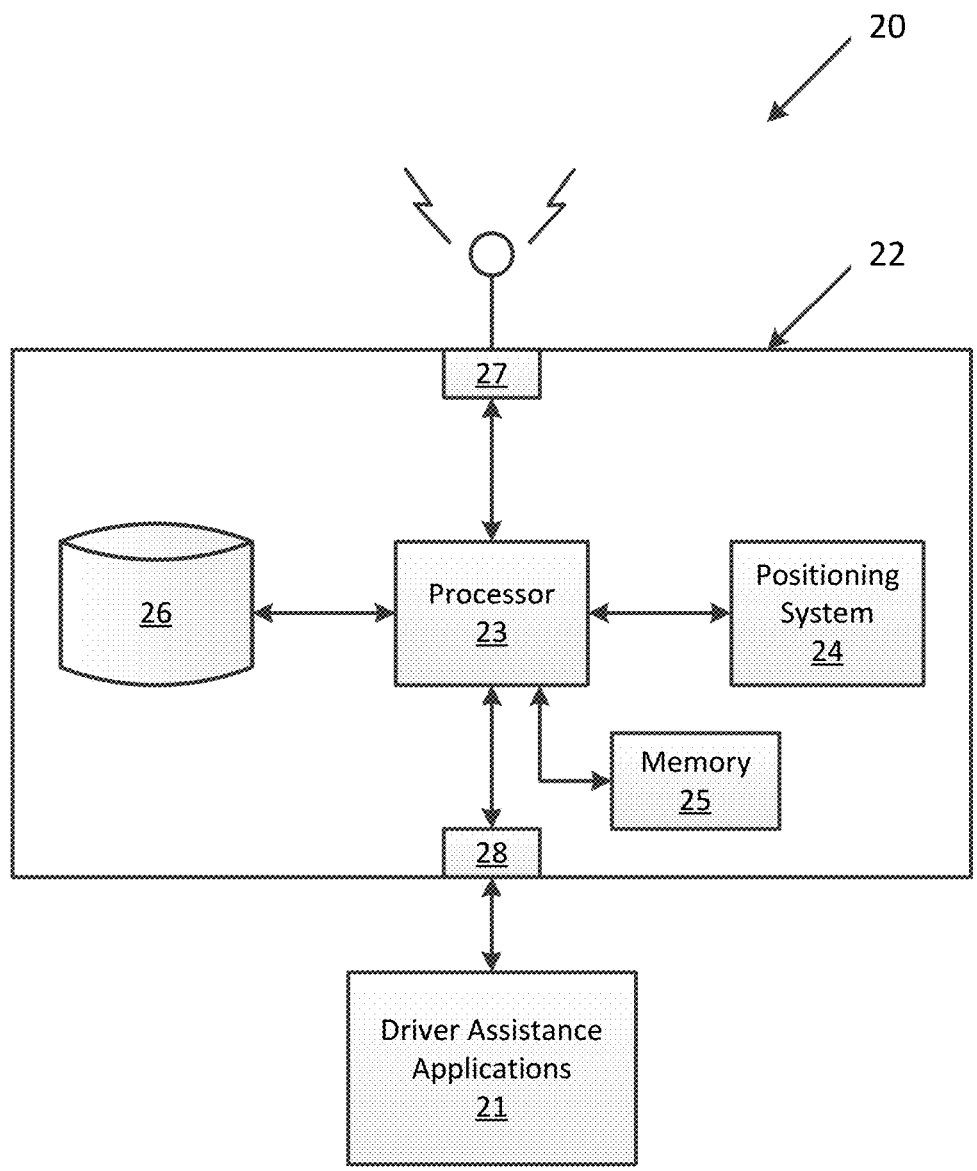
Figure 3:
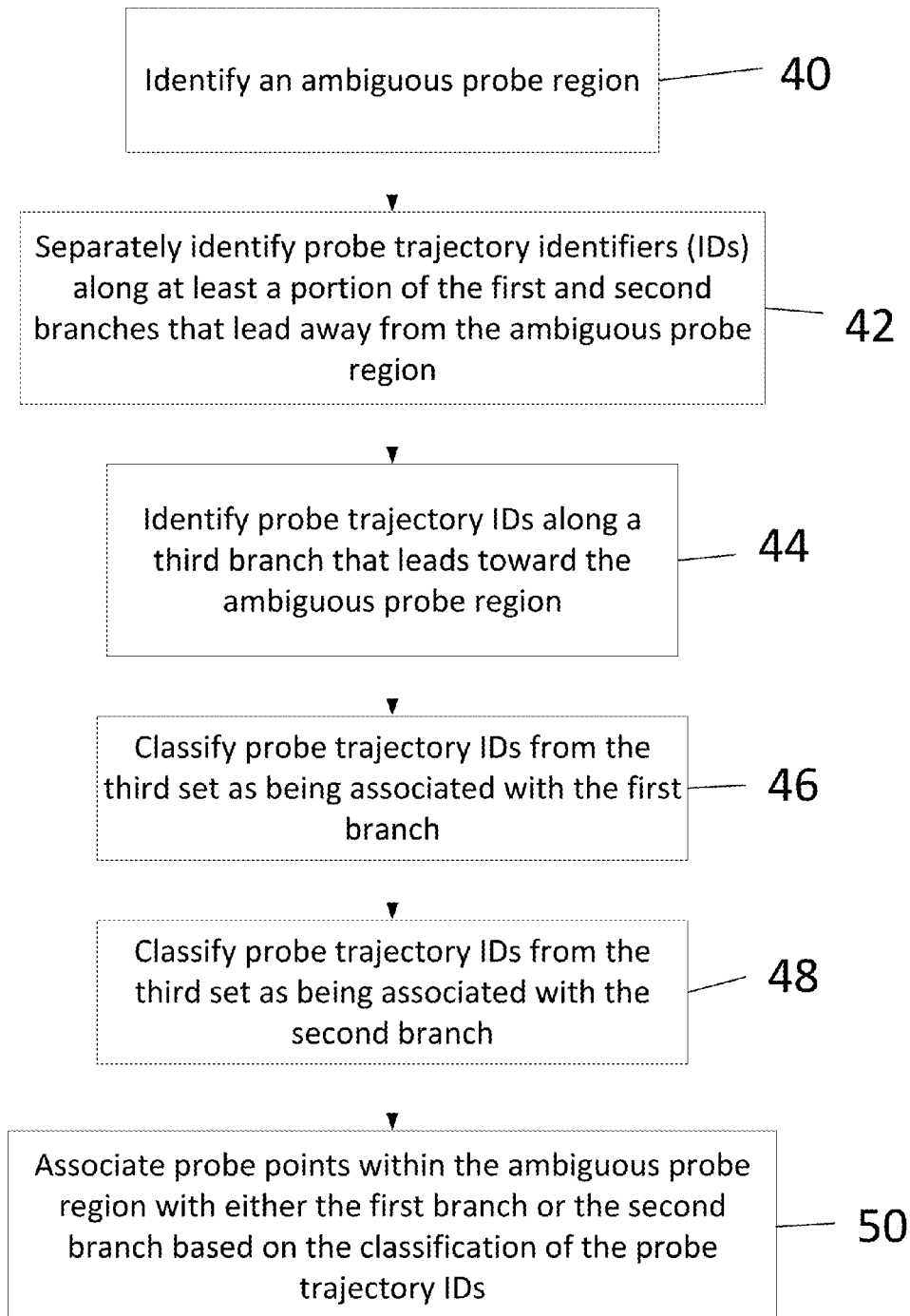
Figure 4:
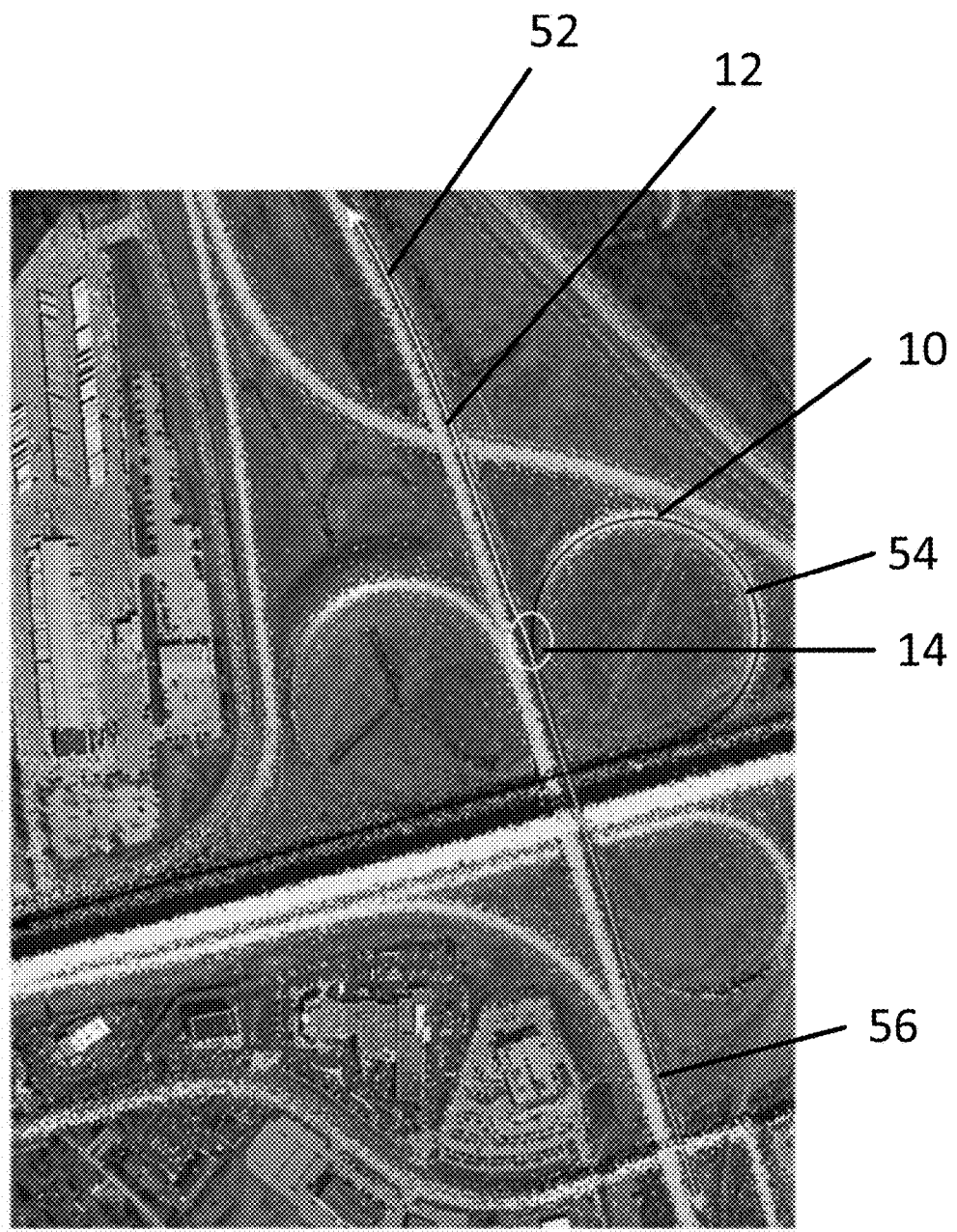
Figure 5:
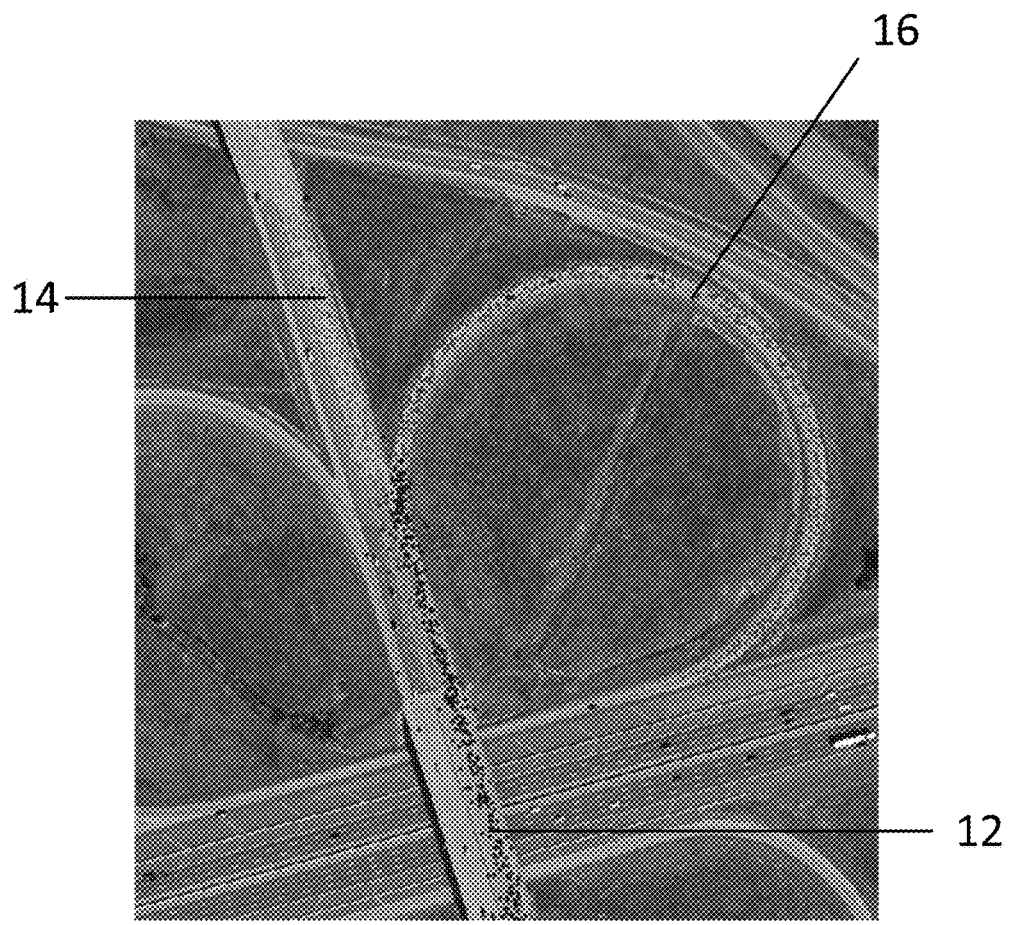
Figure 6:
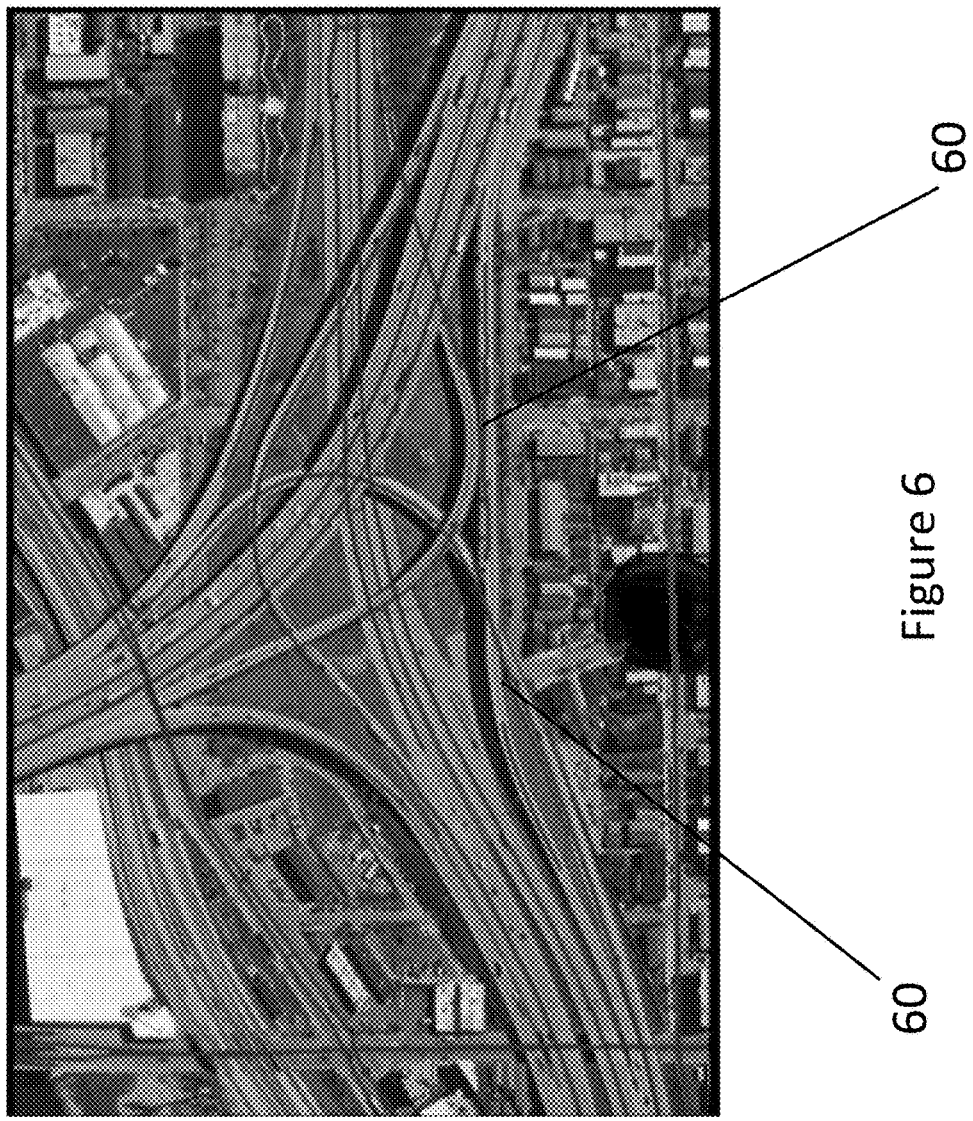
Figure 7:

Having thus described certain example embodiments of the present disclosure in general terms, reference will here- inafter be made to the accompanying drawings, which are not necessarily drawn to scale, and wherein:

FIG. 1 illustrates road geometry including two ambiguous probe regions;

FIG. 2 is a block diagram of an apparatus that may be specifically configured in accordance with an example embodiment of the present invention;

FIG. 3 is a flowchart illustrating the operations performed, such as by the apparatus of FIG. 2, in accordance with an example embodiment of the present invention;

FIG. 4 depicts first, second and third branches that extend outward from an ambiguous probe regions and along which probe trajectory identifiers are identified in accordance with an example embodiment of the present invention;

FIG. 5 depicts the probe points along the first, second and third branches with the probe points along the third branch indicated to be associated with either the first branch or the second branch in accordance with an example embodiment of the present invention;

FIG. 6 depicts a plurality of road segments that create a plurality of ambiguous probe regions; and FIG. 7 illustrates the plurality of road segments of FIG. 6 in which the ambiguous probe regions have been disambiguated in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to create road geometry, such as bi-directional road geometry, from probe data, such as for mapping and navigational purposes and/or for change detection. With respect to mapping and navigational purposes, for example, advanced driver assistance systems (ADAS) was developed to improve the comfort, efficiency, safety and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and light detection and ranging (LIDAR) systems.

Some advanced driver assistance systems also use digital map data. These systems are sometimes referred to as map-enhanced ADAS. The digital map data can be used in advanced driver assistance systems to provide information about the road network, road geometry, road conditions and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

The digital map data that is utilized by map-enhanced ADAS generally represents a road network with a link geometry including a plurality of polylines. For a bi-directional road, map-enhanced ADAS may include different sets of data for each different direction of travel along the road. For example, a map-enhanced ADAS may include data defining the lanes of travel extending in each different direction of travel along the road. Thus, a map-enhanced ADAS may advantageously represent a bi-directional road network with separate sets of polylines representing each different direction of travel along the road such that the different sets of data for each different direction of travel along the road may be associated with a respective set of polylines.

The probe data from which the bi-directional road geometry is created may be collected by a variety of probe sources including those probe sources that provide sparse probe point data and/or probe sources that are slowly moving so as to have increased uncertainty associated with the trajectory thereof. As a result, the method, apparatus and computer program product of an example embodiment are configured to create road geometry based upon probe data collected at various frequencies including low frequency probe data, such as probe points collected at a sampling frequency of no more than one sample per 30 seconds, e.g., probe points collected at a sampling frequency of one sample per 30 to 120 seconds.

The apparatus of an example embodiment may be embodied by a variety of computing devices. For example, the apparatus may be embodied by a server, a personal computer, a computer workstation, a laptop computer, a plurality of networked computing devices or the like. In an example embodiment depicted in FIG. 2, a map-enhanced ADAS architecture 20 includes driver assistance applications 21 and the apparatus 22 that embodies a map and positioning engine (MPE). The MPE is shown in FIG. 2 as a standalone module; however, it is understood that the MPE may be distributed into multiple packages and/or integrated into other device packages, such as a sensor package. The MPE of the illustrated embodiment includes a processor 23, a positioning system 24, a memory 25, a geographic database 26, a communications system 27, and an in-vehicle data bus interface 28. The MPE may also include other hardware, software, and/or firmware, such as a power source.

The processor 23 receives inputs from the positioning system 24, the geographic database 26, the communication system 27, the in-vehicle data bus interface 28, and other sources. The processor then processes the inputs using application software programs. In some embodiments, the processor (and/or co-processors or any other processing circuitry assisting or otherwise associated with the processor) may be in communication with the memory device 25 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 22 may be embodied by a computing device. Although one example is provided above in which the apparatus embodies an MPE, the apparatus may be embodied by other types of computing devices and, as such, need not have all of the components described above in conjunction with the embodiment of FIG. 2. For example, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 23 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 23 may be configured to execute instructions stored in the memory device 25 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication system 27 may be any means such as a device or circuitry embodied in either hardware or a combination of hardware and software that is configured to receive and/or transmit data from/to other electronic devices in communication with the apparatus, such as by being configured to receive data from an in-vehicle global positioning system (GPS), in-vehicle navigation system, a personal navigation device (PND), a portable navigation device or other in-vehicle data collection system. In this regard, the communication system may include, for example, an antenna (or multiple antennas) and supporting hardware and/or software for enabling communications with a wireless communication network. Additionally or alternatively, the communication system may include the circuitry for interacting with the antenna(s) to cause transmission of signals via the antenna(s) or to handle receipt of signals received via the antenna(s). In some environments, the communication system may alternatively or also support wired communication.

The processor 23 of the illustrated embodiment is configured to provide outputs to the driver assistance applications 21 via the in-vehicle data bus interface 28 and a data bus. In an example embodiment, the in-vehicle data bus interface and the data bus are a Controller-Area Network (CAN) interface and a CAN bus, which are designed for automotive applications. The driver assistance applications may include adaptive headlight aiming, adaptive cruise control, obstruction detection, obstruction avoidance, collision avoidance, adaptive shift control, autonomous driving and others.

The positioning system 24 may utilize GPS-type technology, a dead reckoning-type system, or combinations of these or other systems, which are known in the art. The positioning system may also include suitable sensing devices that measure the traveling distance speed, direction, orientation, and so on. For example, the positioning system may include a GPS and a gyroscope. The positioning system provides an output signal to the processor 23. Some of the application software programs that run on the processor use the output signal from the positioning system to determine the location, direction, orientation, etc., of the MPE.

The geographic database 26 of an example embodiment is designed for ADAS applications. Like a navigation system geographic database, the geographic database contains data about roads and intersections in a geographic region. For example, the geographic database contains at least one database record (also referred to as "entity" or "entry") for each road segment (also referred to as a link). The geographic database may include higher quality, that is, more accurate, data than the data typically contained in a navigation system geographic database. For example, with respect to road geometry, the data in the geographic database may be more accurate with respect to longitude, latitude, and/or altitude. Also, the starting and stopping locations of tunnels may be more accurately specified in the geographic database. Further, the data in the geographic database may be more accurate with respect to derived information, such as curvature.

The geographic database 26 may also include more kinds of data (e.g., more kinds of attributes) than the data typically contained in a navigation system geographic database. For example, the geographic database may include data about road objects, such as signs and crosswalks, including their positions along a road segment, sign object type, and sign text. Further details regarding an ADAS architecture 20 of an example embodiment are provided by U.S. patent application Ser. No. 14/622,026 filed Feb. 13, 2015, the contents of which are incorporated herein in their entirety by reference.

In order to create road geometry from probe data as represented by a plurality of probe points or to otherwise disambiguate probe points within an ambiguous probe region, reference is now made to FIG. 3 in which the operations performed, such as by the apparatus 22 of FIG. 2, are depicted. In this regard, the apparatus of an example embodiment includes means, such as the processor 23 or the like, for identifying an ambiguous probe region. See block 40 of FIG. 3. An ambiguous probe region is a region within the road network at which the probe points cannot be reliably associated with a respective road segment with a sufficient degree of confidence. For example, in instances in which there are two or more road segments located near one another for which vehicles driving along the road segments have the same or similar headings, the resulting probe points may lie within an ambiguous probe region in which it is unclear as to which of the road segments the probe points are to be associated. By way of example, ambiguous probe regions maybe defined in instances in which probe data from multiple road segments with similar headings overlap, such as ramps, bifurcations, frontage roads, highway exchange crossovers or adjacent roads, with the resulting probe distributions having similar headings.

An ambiguous probe region may be identified in various manners, such as by identifying a relatively sudden change in the width of a probe distribution comprised of probe points having the same or similar headings. Thus, the processor 23 may be configured to identify an ambiguous probe region by determining the width of a probe distribution comprised of probe points having the same or similar headings and then identifying an instance in which the width of the probe distribution increases suddenly, such as by increasing by at least a predefined amount or at least a predefined percentage within or over a predetermined length of the roadway. In an example embodiment, the apparatus 22 includes means, such as the processor or the like, for identifying an ambiguous probe region by identifying a shift of the road center by at least a predetermined amount. In this regard, the road center is defined by the centerline of the distribution of probe points having the same or similar headings, as measured in a lateral direction perpendicular to the direction in which the road extends, e.g., in a side-to-side direction across the width of the road.

Regardless of the manner in which an ambiguous probe region is identified, the identification of an ambiguous probe region may be performed during the creation of the road geometry or during the traversal of an existing map, such as to identify changes in the road geometry. For an ambiguous probe region, the apparatus 22 also includes means, such as the processor 23 or the like, for separately identifying probe trajectory identifiers (IDs) of probe points along at least a portion of each of a plurality of branches, such as first and second branches, that lead away from the ambiguous probe region. See block 42 of FIG. 3. As shown in FIG. 4, for example, an ambiguous probe region 14 is identified by the probe points at and near the location at which the ramp 10 separates from the highway 12. Thus, the first and second branches that lead away from the ambiguous probe region of this example embodiment include the highway that continues beyond the ambiguous probe region and the ramp that separates from the highway and forms a cloverleaf. Like FIG. 1, the grayscale of the probe points in FIG. 4 is representative of the heading of the probe point, such that probe points of the same grayscale have the same or similar headings while probe points having different grayscales have different headings. The apparatus, such as the processor, is configured to identify the probe trajectory IDs along the portion of the first branch designated as 52 in FIG. 4 that leads away from the ambiguous probe region. Additionally, the apparatus, such as the processor, is configured to identify the probe trajectory IDs along a portion of the second branch designated as 54 in FIG. 4 that leads away from the ambiguous probe region.

The probe points that are collected and stored, such as in memory 25 or geographic database 26, may each include a probe trajectory ID associated therewith. A probe trajectory ID may uniquely identify the probe points collected by a respective device, such as the navigation system for a vehicle, at least for a period of time. Thus, each probe point collected by the same device for at least a period of time will have the same probe trajectory ID, which differs from the probe trajectory IDs associated with the probe points collected by other devices during the same period of time. The probe trajectory IDs identified along respective portions of the first and second branches 52, 54 form first and second sets of probe trajectory IDs, respectively.

In an example embodiment, the apparatus 22, such as the processor 23, separately identifies probe trajectory IDs along the same predefined length of the first and second branches 52, 54 downstream of the ambiguous probe region 14. The predefined length may be defined so as to increase the likelihood that probe trajectory IDs will be identified along the respective portions of the first and second branches for many, if not all, of the probe trajectory IDs for the probe points within the ambiguous probe region. The predefined length along which the first and second branches are evaluated generally increases in a manner inversely proportional to the sampling frequency such that a lower sampling frequency generally leads to the first and second branches being evaluated for a longer predefined length downstream of the ambiguous probe region, while a greater sampling frequency permits the predefined length over which the first and second branches are evaluated downstream of the ambiguous probe region to be shorter. In some embodiments, for example, the respective portions of the first and second branches that are evaluated in order to identify probe trajectory ID may be about 300 yards beyond the ambiguous probe region.

In some embodiments, one or both of the first and second branches may split into two or more sub-branches. For example, in an instance in which the first branch splits into at least two sub-branches, the apparatus 22, such as the processor 23, is configured to identify probe trajectory IDs along at least a portion of the at least two sub-branches of the first branch. For example, an embodiment in which probe trajectory IDs are identified along a predefined length of the first branch, the apparatus, such as the processor, is configured to identify the probe trajectory IDs along each of the sub-branches of the first branch until the first branch, including each of its sub-branches, has been evaluated for the predefined length downstream of the ambiguous probe region.

As shown in block 44 of FIG. 3 as well as in FIG. 4, the apparatus 22 also includes means, such as the processor 23 or the like, for identifying probe trajectories IDs of probe points along a third branch 56 that leads toward the ambiguous probe region 14. The probe trajectory IDs that are identified along the third branch form a third set of probe trajectory IDs. As described above with respect to the first and second branches, the probe trajectory IDs are generally identified along a predetermined length of the third branch upstream of the ambiguous probe region. The predetermined length of the third branch upstream of the ambiguous probe region may be the same length as the predefined length along which the first and second branches are evaluated downstream of the ambiguous probe region, or may be a different length. As also described above in conjunction with the evaluation the first and second branches downstream of the ambiguous probe region, the identification of probe trajectory IDs along the third branch may include the identification of probe trajectory IDs along two or more sub-branches that combine to form the third branch upstream of the ambiguous probe region.

As shown in block 46 of FIG. 3, the apparatus 22 also includes means, such as the processor 23 or the like, for classifying probe trajectory IDs from the third set as being associated with the first branch in an instance in which the probe trajectory IDs are included in both the first and third sets. In order to further refine the classification of the probe trajectory IDs from the third set as being associated with the first branch, the apparatus, such as the processor, of an example embodiment may also exclude probe trajectory IDs from the third set from being associated with the first branch in an instance in which the probe trajectory IDs are also included in the second set. Thus, in this example embodiment, in an instance in which the same probe trajectory ID is included in each of the first, second and third sets, the probe trajectory ID from the third set is not associated with the first branch, but, instead, remains ambiguous.

Similarly, the apparatus 22 also includes means, such as the processor 23 or the like, for classifying probe trajectory IDs from the third set as being associated with the second branch in an instance in which the probe trajectory IDs are included in both the second and third sets. See block 48 of FIG. 3. In order to further refine the classification of the probe trajectory IDs from the third set as being associated with the second branch, the apparatus, such as the processor, of an example embodiment may also exclude probe trajectory IDs from the third set from being associated with the second branch in an instance in which the probe trajectory IDs are also included in the first set. As described above, in this example embodiment, in an instance in which the same probe trajectory ID is included in each of the first, second and third sets, the probe trajectory ID from the third set is not associated with the second branch, but, instead, remains ambiguous.

With reference to the example embodiment of FIG. 5 in which probe points are depicted as dots along the first, second and third branches, the probe points along the third branch that are shown in a respective grayscale are associated with the first branch as a result of the probe trajectory IDs of those probe points along the third branch matching the probe trajectory IDs of probe points along the first branch. For example, those probe points along the third branch may have been collected by vehicles that travelled along the highway from the third branch straight onto the first branch. Similarly, the probe points along the third branch that are shown in a different respective grayscale are associated with the second branch as a result of the probe trajectory IDs of those probe points along the third branch matching the probe trajectory IDs of probe points along the second branch. For example, those probe points along the third branch may have been collected by vehicles that travelled along the third branch and then exited the highway along the ramp that defines the second branch.

Based upon the classification the probe trajectory IDs from the third set as either being associated with the first branch or the second branch, the apparatus 22 of an example embodiment also includes means, such as the processor 23 or the like, for associating probe points within the ambiguous probe region with either the first branch or the second branch. See block 50 of FIG. 3. For example, the probe points within the ambiguous probe region that have probe trajectory ID that are included in both the first and third sets, but not in the second set, may be classified as being associated with the first branch. Similarly, the probe points within the ambiguous probe region that have probe trajectory ID that are included in both the second and third sets, but not in the first set, may be classified as being associated with the second branch. With reference to FIG. 5, for example, the probe points within the ambiguous probe region are shown to have different grayscales as a result of the association with the first branch represented by the ongoing highway or the second branch represented by the ramp exiting from the highway, respectively. Thus, the probe points within the ambiguous probe region may be associated with a respective road segment in a more reliable manner having a greater degree of confidence associated therewith. Although the classification of the probe points within the ambiguous probe region as being associated with either the first or second branch may be performed separate from, such as following, the classification of the probe points along the third branch that leads to the ambiguous probe region, the third branch may be defined in accordance with another embodiment so as to include the ambiguous probe region such that the probe points within the ambiguous probe region may be classified as being associated with either the first branch or the second branch at the same time as the remainder of the probe points along the third branch are classified.

As a result of the increased accuracy with which the probe points within an ambiguous probe region may be associated with a respective road segment, the resulting road geometry may be defined more accurately as well. With respect to FIG. 6 for example, a plurality of polylines may be defined based upon an analysis of probe data in order to represent a relatively complex road network. In the embodiment depicted in FIG. 6, the polylines are shown as the dark lines extending along the different road segments. As a result of the proximity of multiple road segments for which the vehicles travelling along the road segments have the same or similar headings, a plurality of ambiguous probe regions are defined. In FIG. 6, for example, the ambiguous probe regions include those regions along the road segment in which a gap between polylines exist, such as the gaps designated 60. By disambiguating the probe points within the ambiguous probe regions, additional polylines may be defined based upon the probe points within the ambiguous probe regions in order to complete the definition of the road network. In this regard, polylines may be defined for regions that were previously ambiguous probe regions, some of which are shown at by the segments designated 70 in FIG. 7, as a result of the association of the probe points within the ambiguous probe regions with respective road segments of the road network. Consequently, the resulting road geometry may be created in a more complete and accurate fashion and/or changes to an existing road geometry may be identified in a reliable manner.

FIG. 3 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 25 of an apparatus 22 employing an embodiment of the present invention and executed by a processor 23 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method implemented by an advanced driver assistance system (ADAS), wherein the advanced driver assistance system comprises one or more driver assistance applications and a map and positioning engine, wherein the map and positioning engine comprises a positioning system comprising one or more sensing devices configured to measure one or more of speed, direction or orientation and an in-vehicle data bus interface, and wherein, based on information provided by the positioning system, the method comprises:

identifying an ambiguous probe region by identifying an instance in which a width of a probe distribution increases by at least a predefined amount or a predefined percentage within a predetermined length of a roadway or in an instance in which a road center shifts by at least a predetermined amount;

for the ambiguous probe region, separately identifying probe trajectory identifiers (IDs) of probe points along at least a portion of each of first and second branches that lead away from the ambiguous probe region, wherein the probe trajectory IDs identified along at least a portion of the first and second branches comprise first and second sets of probe trajectory IDs, respectively;

for the ambiguous probe region, identifying probe trajectory IDs of the probe points along a third branch that leads toward the ambiguous probe region, wherein the probe trajectory IDs along the third branch comprise a third set of probe trajectory IDs;

classifying probe trajectory IDs from the third set as being associated with the first branch in an instance in which the probe trajectory IDs are included in both the first and third sets;

classifying probe trajectory IDs from the third set as being associated with the second branch in an instance in which the probe trajectory IDs are included in both the second and third sets;

creating road geometry for mapping or navigational purposes or detecting a change in the road geometry at least partially based upon classification of the probe trajectory IDs from the third set as being associated with either the first branch or the second branch; and causing the road geometry to be provided to the one or more driver assistance applications via the in-vehicle data bus interface such that the road geometry created or the change in the road geometry detected is used for mapping or navigational purposes.

2. A method according to claim 1 further comprising:
associating one or more probe points in the ambiguous probe region with the first branch in an instance in which the one or more probe points have probe trajectory IDs that match the probe trajectory IDs from the third set that are classified as being associated with the first branch; and
associating one or more probe points in the ambiguous probe region with the second branch in an instance in which the one or more probe points have probe trajectory IDs that match the probe trajectory IDs from the third set that are classified as being associated with the second branch.

3. A method according to claim 1 wherein classifying the probe trajectory IDs from the third set as being associated with the first branch comprises excluding probe trajectory IDs from the third set from being associated with the first branch in an instance in which the probe trajectory IDs are also included in the second set.

4. A method according to claim 1 wherein classifying the probe trajectory IDs from the third set as being associated with the second branch comprises excluding probe trajectory IDs from the third set from being associated with the second branch in an instance in which the probe trajectory IDs are also included in the first set.

5. A method according to claim 1 wherein the probe trajectory IDs are associated with probe points collected at a sampling frequency of no more than one sample per 30 seconds.

6. A method according to claim 1 wherein separately identifying probe trajectory IDs of the probe points along at least a portion of the first and second branches comprises separately identifying probe trajectory IDs of the probe points along a same predefined length of the first and second branches downstream of the ambiguous probe region.

7. A method according to claim 1 wherein the first branch splits into at least two sub-branches, and wherein separately identifying probe trajectory IDs of the probe points along at least a portion of the first and second branches comprises identifying probe trajectory IDs of the probe points along at least a portion of the at least two sub-branches of the first branch and including the probe trajectory IDs along at least a portion of the at least two sub-branches in the first set of probe trajectory IDs.

8. An advanced driver assistance system (ADAS) comprising:
one or more driver assistance applications; and
an apparatus comprising a map and positioning engine, wherein the map and positioning engine comprises:
a positioning system comprising one or more sensing devices configured to measure one or more of speed, direction or orientation;
at least one processor and at least one memory storing computer program codes; and
an in-vehicle data bus interface,
wherein the at least one memory and stored computer program code are configured, with the at least one processor and based on information provided by the positioning system, to cause the apparatus to at least:
identify an ambiguous probe region by identifying an instance in which a width of a probe distribution increases by at least a predefined amount or a predefined percentage within a predetermined length of a roadway or in an instance in which a road center shifts by at least a predetermined amount;
for the ambiguous probe region, separately identify probe trajectory identifiers (IDs) of probe points along at least a portion of each of first and second branches that lead away from the ambiguous probe region, wherein the probe trajectory IDs identified along at least a portion of the first and second branches comprise first and second sets of probe trajectory IDs, respectively;
for the ambiguous probe region, identify probe trajectory IDs of the probe points along a third branch that leads toward the ambiguous probe region, wherein the probe trajectory IDs along the third branch comprise a third set of probe trajectory IDs;
classify probe trajectory IDs from the third set as being associated with the first branch in an instance in which the probe trajectory IDs are included in both the first and third sets;
classify probe trajectory IDs from the third set as being associated with the second branch in an instance in which the probe trajectory IDs are included in both the second and third sets;
create road geometry for mapping or navigational purposes or detect a change in the road geometry at least partially based upon classification of the probe trajectory IDs from the third set as being associated with either the first branch or the second branch; and
cause the road geometry to be provided to the one or more driver assistance applications via the in-vehicle data bus interface such that the road geometry created or the change in the road geometry detected is used for mapping or navigational purposes.

9. An advanced driver assistance system according to claim 8 wherein the at least one memory and stored computer program code are further configured, with the at least one processor, to cause the apparatus to:
associate one or more probe points in the ambiguous probe region with the first branch in an instance in which the one or more probe points have probe trajectory IDs that match the probe trajectory IDs from the third set that are classified as being associated with the first branch; and associate one or more probe points in the ambiguous probe region with the second branch in an instance in which the one or more probe points have probe trajectory IDs that match the probe trajectory IDs from the third set that are classified as being associated with the second branch.

10. An advanced driver assistance system according to claim 8 wherein the at least one memory and stored computer program code are configured, with the at least one processor, to cause the apparatus to classify the probe trajectory IDs from the third set as being associated with the first branch by excluding probe trajectory IDs from the third set from being associated with the first branch in an instance in which the probe trajectory IDs are also included in the second set.

11. An advanced driver assistance system according to claim 8 wherein the at least one memory and stored computer program code are configured, with the at least one processor, to cause the apparatus to classify the probe trajectory IDs from the third set as being associated with the second branch by excluding probe trajectory IDs from the third set from being associated with the second branch in an instance in which the probe trajectory IDs are also included in the first set.

12. An advanced driver assistance system according to claim 8 wherein the probe trajectory IDs are associated with probe points collected at a sampling frequency of no more than one sample per 30 seconds.

13. An advanced driver assistance system according to claim 8 wherein the at least one memory and stored computer program code are configured, with the at least one processor, to cause the apparatus to separately identify probe trajectory IDs of the probe points along at least a portion of the first and second branches by separately identifying probe trajectory IDs of the probe points along a same predefined length of the first and second branches downstream of the ambiguous probe region.

14. An advanced driver assistance system according to claim 8 wherein the first branch splits into at least two sub-branches, and wherein the at least one memory and stored computer program code are configured, with the at least one processor, to cause the apparatus to separately identify probe trajectory IDs of the probe points along at least a portion of the first and second branches by identifying probe trajectory IDs of the probe points along at least a portion of the at least two sub-branches of the first branch and including the probe trajectory IDs along at least a portion of the at least two sub-branches in the first set of probe trajectory IDs.

15. A computer program product of an advanced driver assistance system (ADAS), wherein the advanced driver assistance system comprises one or more driver assistance applications and a map and positioning engine, wherein the map and positioning engine comprises a positioning system comprising one or more sensing devices configured to measure one or more of speed, direction or orientation and an in-vehicle data bus interface, wherein the computer program product comprises at least one non-transitory computer-readable storage medium having computer-readable program instructions stored therein, and wherein, based on information provided by the positioning system, the computer-readable program instructions comprising:

program instructions configured to identify an ambiguous probe region by identifying an instance in which a width of a probe distribution increases by at least a predefined amount or a predefined percentage within a predetermined length of a roadway or in an instance in which a road center shifts by at least a predetermined amount;

for the ambiguous probe region, program instructions configured to separately identify probe trajectory identifiers (IDs) of the probe points along at least a portion of each of first and second branches that lead away from the ambiguous probe region, wherein the probe trajectory IDs identified along at least a portion of the first and second branches comprise first and second sets of probe trajectory IDs, respectively;

for the ambiguous probe region, program instructions configured to identify probe trajectory IDs of the probe points along a third branch that leads toward the ambiguous probe region, wherein the probe trajectory IDs along the third branch comprise a third set of probe trajectory IDs;

program instructions configured to classify probe trajectory IDs from the third set as being associated with the first branch in an instance in which the probe trajectory IDs are included in both the first and third sets;

program instructions configured to classify probe trajectory IDs from the third set as being associated with the second branch in an instance in which the probe trajectory IDs are included in both the second and third sets;

program instructions configured to create road geometry for mapping or navigational purposes or to detect a change in the road geometry at least partially based upon classification of the probe trajectory IDs from the third set as being associated with either the first branch or the second branch; and program instructions configured to cause the road geometry to be provided to the one or more driver assistance applications via the in-vehicle data bus interface such that the road geometry created or the change in the road geometry detected is used for mapping or navigational purposes.

16. A computer program product according to claim 15 wherein the computer-readable program instructions further comprise:

program instructions configured to associate one or more probe points in the ambiguous probe region with the first branch in an instance in which the one or more probe points have probe trajectory IDs that match the probe trajectory IDs from the third set that are classified as being associated with the first branch; and program instructions configured to associate one or more probe points in the ambiguous probe region with the second branch in an instance in which the one or more probe points have probe trajectory IDs that match the probe trajectory IDs from the third set that are classified as being associated with the second branch.

17. A computer program product according to claim 15 wherein the program instructions configured to separately identify probe trajectory IDs of the probe points along at least a portion of the first and second branches comprise program instructions configured to separately identify probe trajectory IDs of the probe points along a same predefined length of the first and second branches downstream of the ambiguous probe region.

* * * * *

UNITED STATES PATENT AND TRADEMARK OFFICE
CERTIFICATE OF CORRECTION

PATENT NO.         : 10,247,559 B2
APPLICATION NO.    : 15/144130
DATED              : April 2, 2019
INVENTOR(S)        : Ole H. Dorum It is certified that error appears in the above-identified patent and that said Letters Patent is hereby corrected as shown below:

In the Claims

Column 18
Line 17, Claim 8 delete "codes" and insert --code--

Signed and Sealed this
Tenth Day of December, 2019

Andrei Iancu
*Director of the United States Patent and Trademark Office*